United States Patent [19]

Kuwabara et al.

[11] Patent Number: 4,874,999
[45] Date of Patent: Oct. 17, 1989

[54] AUTOMATIC CONTROL SYSTEM

[75] Inventors: Takao Kuwabara, Hitachi; Kazuo Takahashi, Hitachiota, both of Japan

[73] Assignee: Hitachi, Ltd., Tokyo, Japan

[21] Appl. No.: 275,367

[22] Filed: Nov. 23, 1988

[30] Foreign Application Priority Data

Nov. 25, 1987 [JP] Japan .................................. 62-295282

[51] Int. Cl.$^4$ .............................................. G05B 11/42
[52] U.S. Cl. ...................................... 318/610; 364/162
[58] Field of Search ....................... 318/609, 610, 561; 364/162, 161, 160

[56] References Cited

U.S. PATENT DOCUMENTS

| | | | |
|---|---|---|---|
| 4,346,433 | 8/1982 | Rutledge | 318/610 X |
| 4,549,123 | 10/1985 | Hagglund et al. | 318/610 |
| 4,587,470 | 5/1986 | Yamawaki | 318/610 X |
| 4,623,827 | 11/1986 | Ito | 318/610 X |
| 4,733,149 | 3/1988 | Culberson | 318/610 X |
| 4,806,836 | 2/1989 | Webb | 318/610 X |

FOREIGN PATENT DOCUMENTS 4622409 6/1971 Japan .

*Primary Examiner*—Benjamin Dobeck
*Attorney, Agent, or Firm*—Fay, Sharpe, Beall, Fagan, Minnich & McKee

[57] ABSTRACT

In an automatic control system including first and second control circuits, at least the second control circuit includes a proportional circuit and a differentiation circuit in addition to an integration circuit. When an object is controlled by switching from the first control circuit to the second circuit, an error signal between a target signal and a feedback signal is first applied to the integration circuit of the second control circuit, and after the lapse of predetermined time, the error signal is applied to the proportional circuit and the differentiation circuit of the second control circuit. With the constitution, jumping phenomenon is prevented which would be caused from the proportional circuit and the differentiation circuit.

8 Claims, 15 Drawing Sheets

FIG. 6
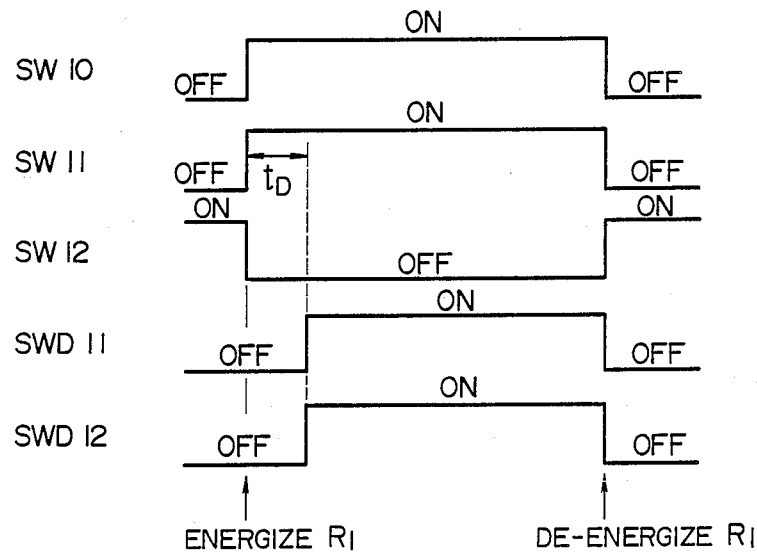
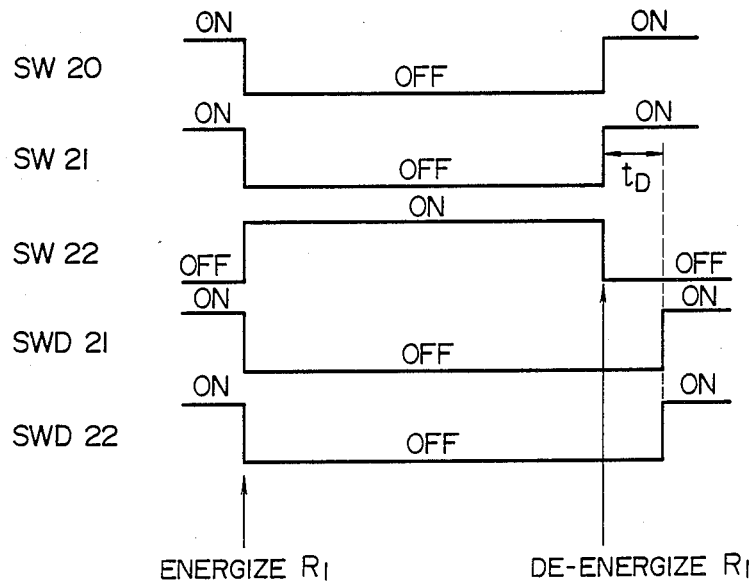

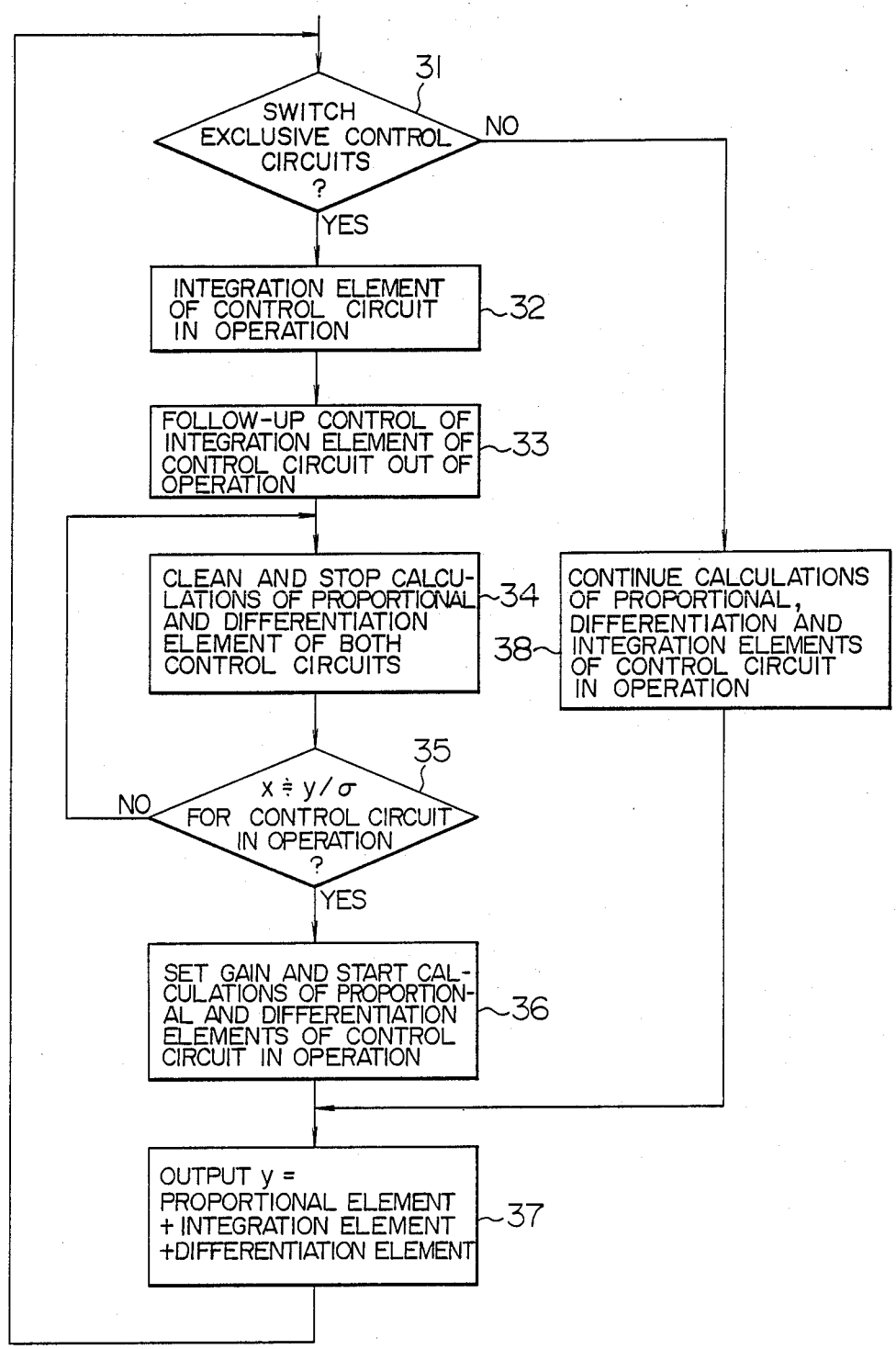

AUTOMATIC CONTROL SYSTEM

BACKGROUND OF THE INVENTION

The present invention relates to an automatic control system in which an input signal or a control circuit is selected in accordance with an operation mode, or more in particular to an automatic control system suitable for avoiding the phenomenon of jump of an output amount in switching the operation mode.

JP-A No. 46-22409, for example, discloses an exclusive control circuit of proportional operation type for automatically controlling an output terminal in accordance with a given condition amount and a manual exclusive control circuit for manually controlling an output terminal, which control circuits are switched in accordance with the operation mode.

Both of the exclusive control circuits disclosed in this conventional system are configured of a simple element of proportional operation or an element of operation of first-order lag.

The disclosed well-known system has not any exclusive control circuits of P (proportional operation)+I (integral operation) type or I+D (differential operation) type covered by the present invention. Specifically, in the case where operation elements such as a P operation element or D operation element in which the signal on output side changes in jump with the change in the signal on input side by switching are arranged in parallel (with an input shared to affect a change in the output terminals of the two operation elements), the amount of instantaneous output change by switching of the operation mode of the P operation element or D operation element is determined by the gain of the P operation element or D operation element respectively, while the signal switching rate on the input side is predetermined, so that the signal on the output side changes in jump, thereby making smooth switching impossible when the gain of the P operation element or the D operation element is comparatively great.

SUMMARY OF THE INVENTION

The object of the present invention is to provide a method of switching control by which the signal at an output terminal is prevented from a sudden change by jump at the time of switching the operation mode even when an exclusive control circuit is configured of a parallel arrangement of an I element and an element of (I+P) type, (I+D) type or (I+P+D) type whose output signal changes by jump with the change in the input signal.

In order to achieve the above-mentioned object, according to the present invention, there is provided an automatic control system comprising (1) means in which the output of an I element (or other control element having a function equivalent thereto) of an exclusive control circuit in suspension is rendered to automatically follow the output (or equivalent signal) of an exclusive control circuit in operation, or more specifically, the error between the output of the exclusive control circuit in operation and the output of the I element is used as an input signal to the I element so that the output of the I element is caused to automatically follow the output of the exclusive control circuit in operation by self-correction to the extent that the error exists, (2) means of substantially eliminating the elements P and D other than those of the exclusive control circuit in suspension, or more specifically, reducing the gains of these elements to zero or preventing the output signals of these elements from appearing at the output terminal of the exclusive control circuit in suspension by switch, (3) means in which when the exclusive control circuit in suspension is switched to operation, the P element or D element of the exclusive control circuit is not released immediately from "elimination" but only the I element is released therefrom and only after the transition to a new operating condition is complete substantially, the P element or D element is released from "elimination" to shift to the original operation of I+P, I+D or I+P+D, and (4) means in which a P or D element of an exclusive control circuit switched from operation to suspension is substantially eliminated simultaneously with the switching.

The above-mentioned means (1) achieves what is called a follow-up control of an exclusive control circuit in suspension. The means (2) is provided for preventing the P or D element not required during suspension (but required for improving stability or responsivility during operation) from deteriorating the accuracy of the follow-up control of the means (1). The means (3), on the other hand, is for preventing the output of an exclusive control circuit just switched to operation from changing abruptly by jump in view of the fact that such an exclusive control circuit just switched to operation is in a transient condition for adaptation to a new status, that is, the error between the new input to the I element and the output of the exclusive control circuit is in a transient condition for adaptation to a new status, that is, the error between the new input to the I element and the output of the exclusive control circuit is not yet sufficiently converged to a point near zero where an active P or D element does not cause an abrupt change by jump of the output of the exclusive control circuit.

BRIEF DESCRIPTION OF THE DRAWINGS

FIG. 6 is a time chart showing the operation of the change-over switch included in FIG. 5.

FIG. 15 is a digital flowchart useful for explaining the operation of the present invention.

DESCRIPTION OF THE PREFERRED EMBODIMENTS

The phenomenon of jump in switching the operation of exclusive control circuits described above is caused by the fact that an output signal is produced by an integral gain, proportional gain or differential gain independently of the input signal applied to each of the exclusive control circuits regardless of whether an exclusive control circuit is in operation or not. This phenomenon is considered to be prevented by the follow-up control as shown in FIG. 1.

Figure 1:
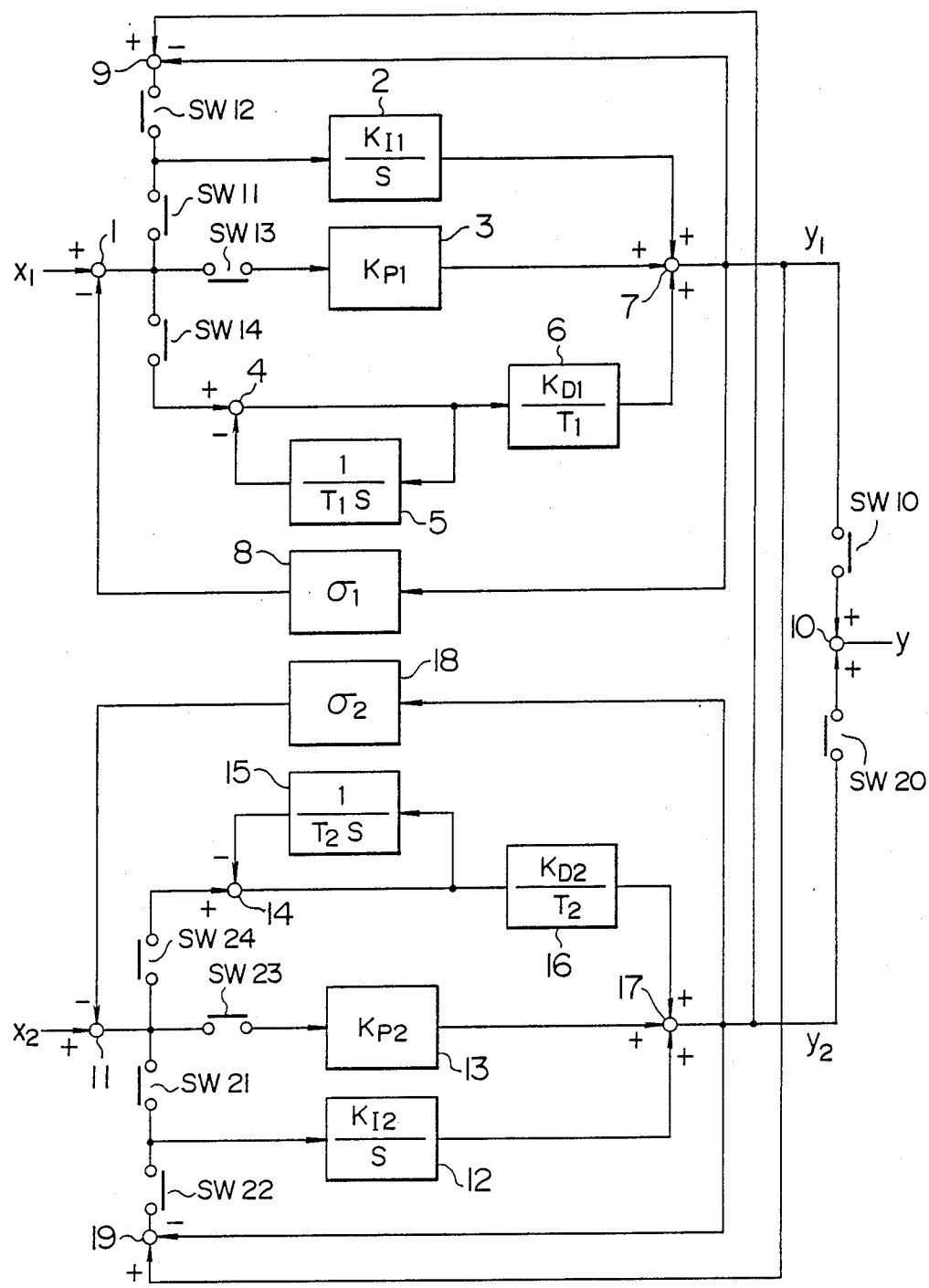
FIG. 1 is a diagram showing a control circuit having a follow-up control useful for explaining an embodiment of the present invention.

In FIG. 1, in order that the output $y_2$ of a second exclusive control circuit in operation may be followed by the output of an eliminated integral element 2 of a first exclusive control circuit, the input to an integration element 2 of a control signal from the input $x_1$ of the first exclusive control circuit is eliminated by a change-over switch SW 11. The error between the output value of the second exclusive control circuit and that of the integration element 2 is calculated at an adding point 9, and by turning on a change-over switch SW 12, is applied to the integration circuit 2.

Further, in this follow-up control, in order to prevent the effect of the proportional element 3 and the incomplete differentiation elements 4, 5 and 6, input signals to those elements are eliminated by change-over switches SW 13 and SW 14.

This system is so constructed that even when the operation of the automatic control system is switched from the second exclusive control circuit to the first exclusive control circuit, the second exclusive control circuit, like the first exclusive control circuit explained above, has only the integration element 12 followed by the output value of the first exclusive control circuit in operation.

The change-over switches SW 10 to SW 14 and SW 20 to SW 24 are operated upon switching of the operation.

Figure 2:
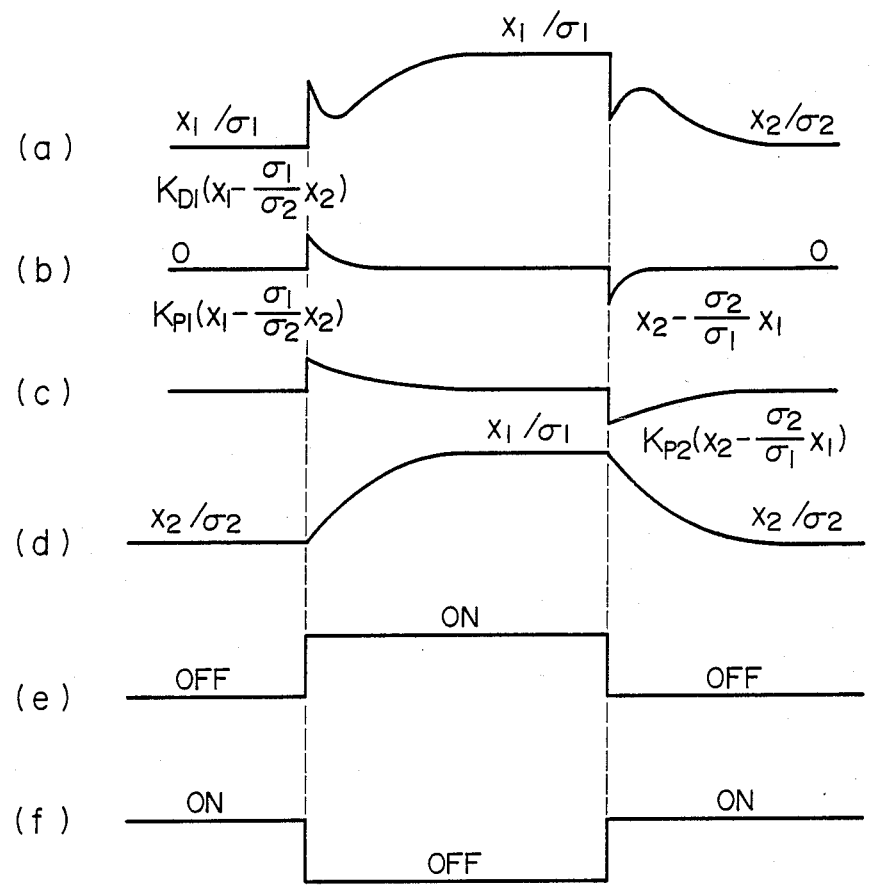
FIG. 2 shows an output characteristic of a control circuit comprising the follow-up control shown in FIG. 1.

In the automatic control system shown in FIG. 1, the output shown in FIG. 2 is produced when the operation is switched from the second exclusive control circuit to the first exclusive control circuit.

The output of the integration element 2 of the first exclusive control circuit smoothly shifts to a control target value $x_1/\sigma_1$ given by an input signal $x_1$ to the first exclusive control circuit as shown in FIG. 2(d), thus preventing the jump due to the integration element. At the same time that the operation is switched from the second exclusive control circuit to the first exclusive control circuit, however, the error $(x_1 - \sigma_1/\sigma_2 \times 2)$ is applied to the proportional element 3 and the incomplete differentiation elements 4, 5, 6, outputs of which are changed in the manner shown in FIGS. 2(b) and 2(c). These outputs are produced collectively at a junction point 7.

As a result, the output of the first exclusive control circuit undergoes a change as shown in FIG. 2(a), indicating that the jump at the switching point is not completely prevented.

The present invention is provided in order to obviate the above-mentioned problem. A first embodiment of the invention is shown in FIG. 3.

According to the present invention, the output of an integration element of an exclusive control circuit eliminated is caused to follow the output of an exclusive control circuit in operation as in the system explained with reference to FIG. 1. According to the present invention, however, in order to prevent the effect of a proportional or incomplete differentiation element in switching between operation and elimination of an exclusive control circuit, a time function is incorporated in the conditions for the operation of a change-over switch to connect and disconnect the input to the proportional element and the incomplete differentiation element. The operation of an automatic control system according to the present invention will be explained below in detail.

Figure 3:
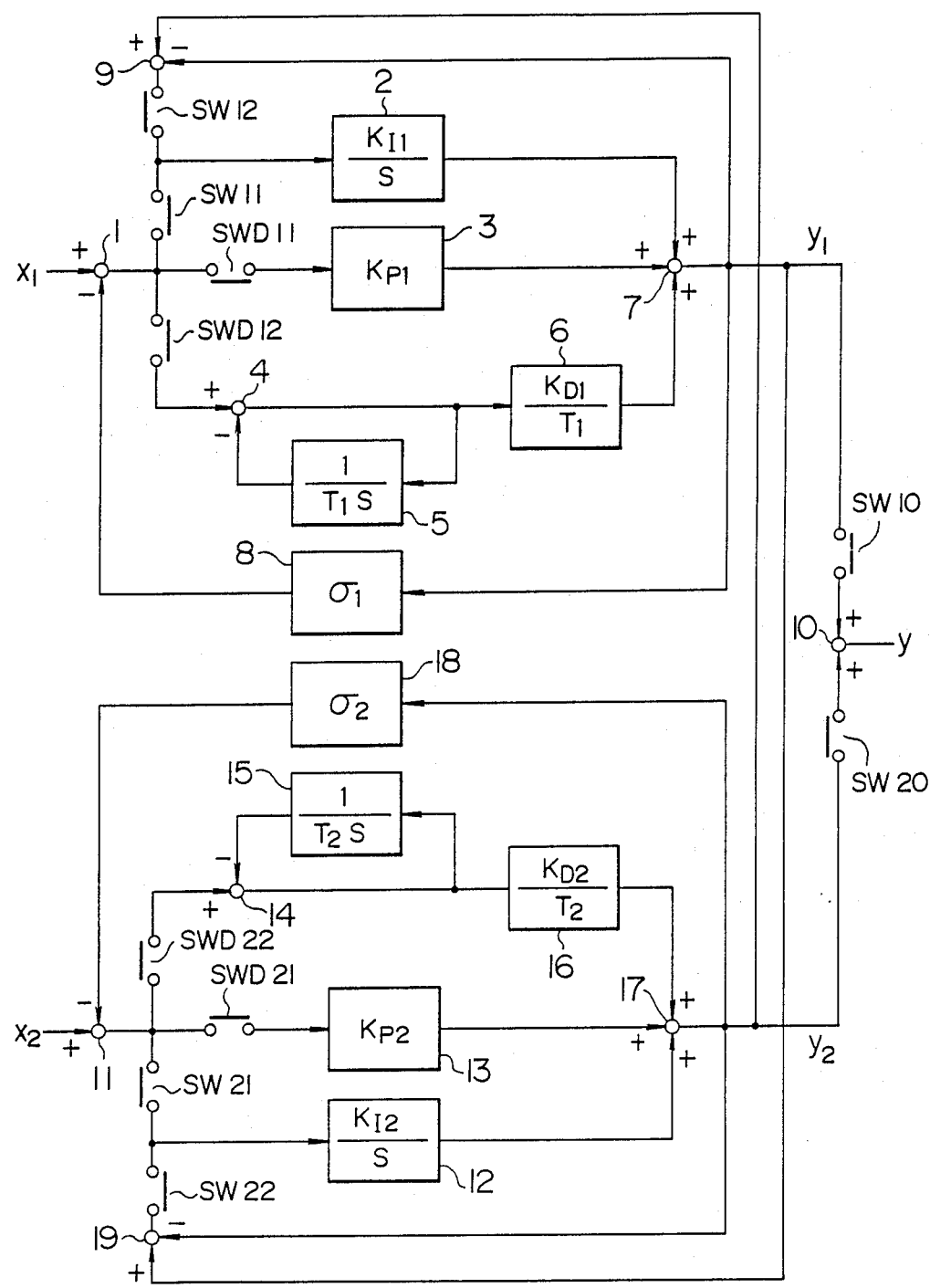
FIG. 3 is a diagram showing a control circuit for an automatic control system according to a first embodiment of the present invention.

In FIG. 3, in the case where a second exclusive control circuit of the automatic control system is in operation, SW 20, SW 21, SWD 23 and SWD 24 of all the change-over switches of the second exclusive control circuit are opened. Specifically, an integration element 12, a proportional element 14 and incomplete differentiation elements 14, 15, 16 of the second exclusive control circuit are operated in accordance with an input $x_2$ applied thereto, and further an output $y_2$ is produced by integration of outputs from each element at a junction point 17. The output y of the automatic control system is of course equal to $y_2$.

In the first exclusive control circuit eliminated from operation, on the other hand, the change-over switches SW 10, SW 11, SWD 13 and SWD 14 are opened, and SW 12 closed. As a result, the proportional element 3 and the incomplete differentiation elements 4, 5, 6 remain inoperative (zero output), while the integration element 2 is adapted to follow the operation of the output $y_2$ of the second exclusive control circuit.

Figure 4:
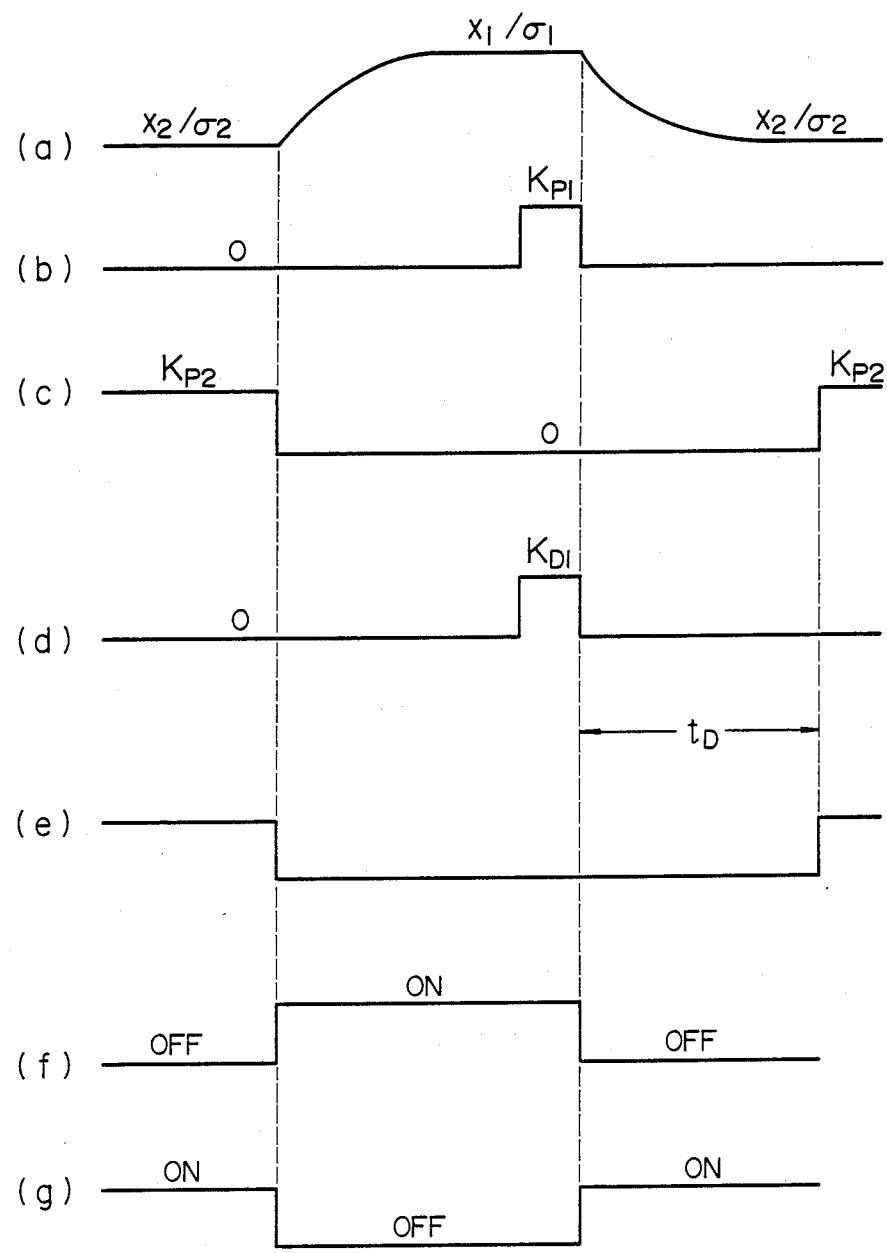
FIG. 4 is an output characteristic of the control circuit shown in FIG. 1.

When the operation is switched from the second exclusive control circuit to the first exclusive control circuit, the second exclusive control circuit has the change-over switches SW 20, SW 21, SWD 23 and SWD 24 immediately opened and SW 22 immediately closed, thus making ready for following the output $y_1$ of the first exclusive control circuit. In the first exclusive control circuit, on the other hand, the change-over switches SW 10 and SW 11 are immediately closed and the switch SW 12 immediately opened, so that the integration element 2 smoothly shifts to a control target value based on the input $x_1$. Further, the opening timing of the change-over switches SWD 13 and SWD 14 are set in the manner described below to prevent the jumping phenomenon at the time of switching the operation. The operation of this automatic control system is shown in FIG. 4.

The change-over switches described above are operated by the logics shown in FIG. 5. Specifically, while the first exclusive control circuit is in operation, a relay R1 is normally excited with the change-over switches SW 10, SW 11 and SW 12 normally open at the contact of the relay R1 and the change-over switches SW 20, SW 12 and SW 21 normally open at the contact of the relay R1. Further, the change-over switches SWD 11 and SWD 12 provide a contact of a timer T1 adapted to close and produce an output after the lapse of a predetermined time following the closing of the contact a of the relay R1. The change-over switches SWD 21 and SWD 22, on the other hand, constitute a contact of a timer 2 adapted to close and produce an output after the lapse of a predetermined time following the closing of the contact b of the relay R1. When the second exclusive control circuit is switched to operation, the relay R1 is de-energized so that the change-over switches SW 10, SW 11 and SW 22 open while the change-over switches SW 20, SW 12 and SW 21 are closed.

In the case where the relay R1 is energized, as shown in FIG. 18, the change-over switches SW 10, SW 11, SW 13, SW 14, SW 15, SW 16 and SW 22 are closed in operatively interlocked relations with the operation of the relay R1. Further, upon de-energization of the relay R1, the change-over switches SW 20, SW 21, SW 22, SW 24, SW 25, SW26 and SW 12 are closed.

Figure 5:
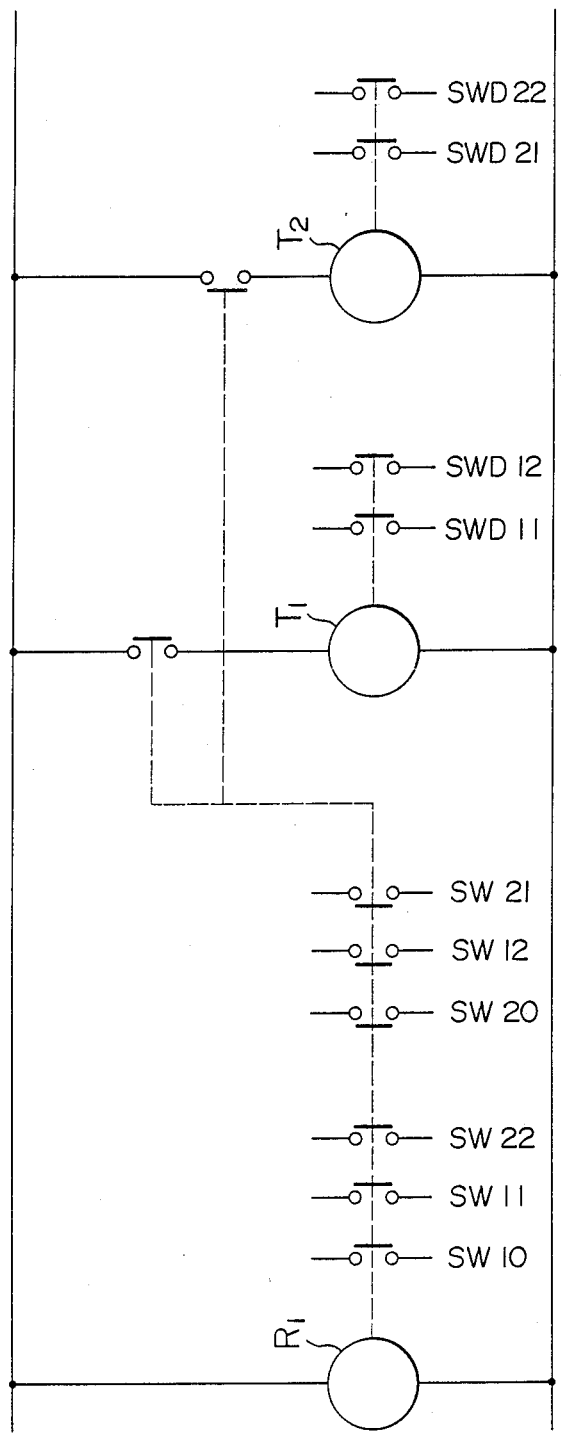
FIG. 5 shows a logic circuit for a change-over switch used for the control circuit shown in FIG. 1.
Figure 10:
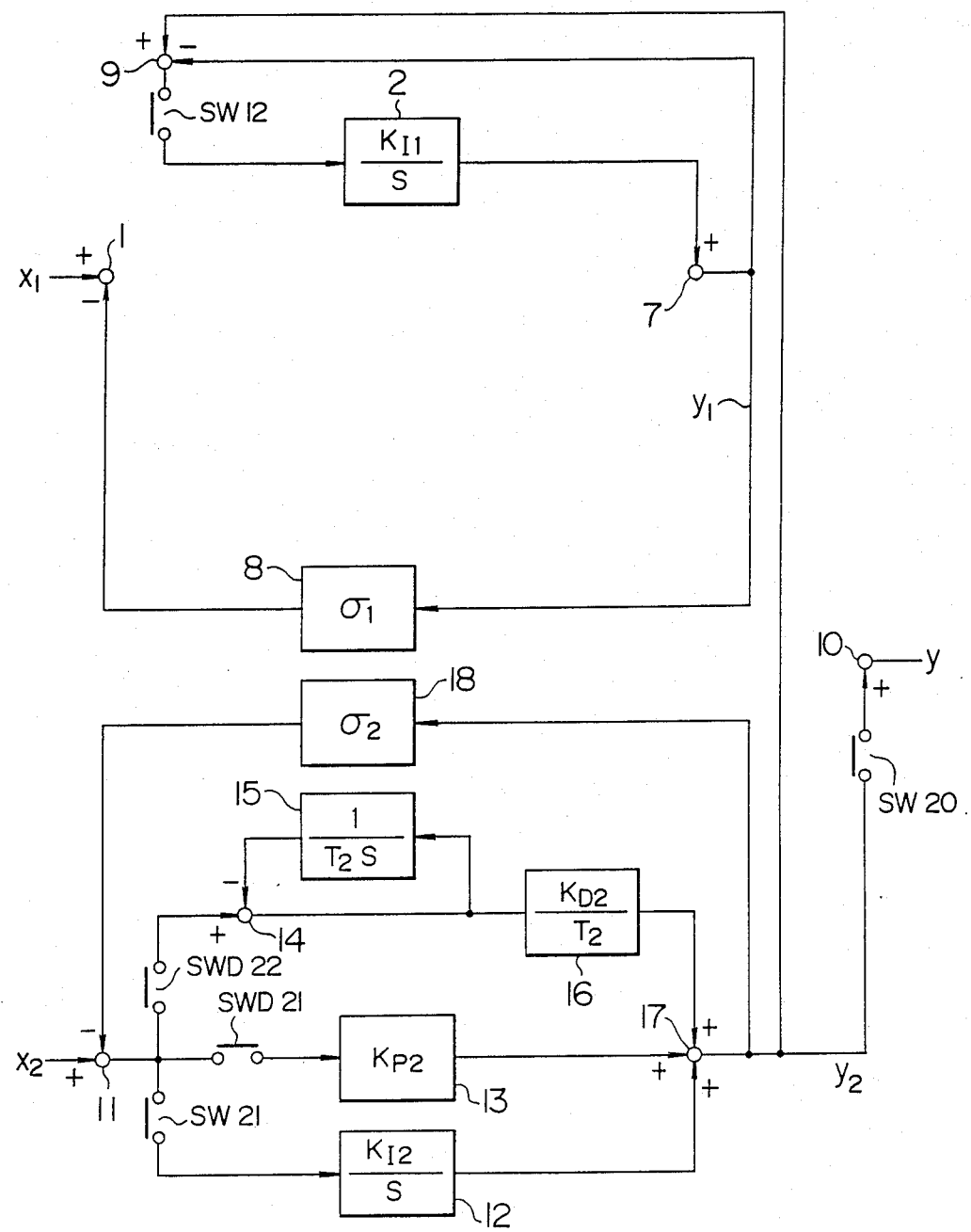
FIG. 10 shows an automatic control circuit used when a second exclusive control circuit is in operation according to the present invention.
Figure 11:
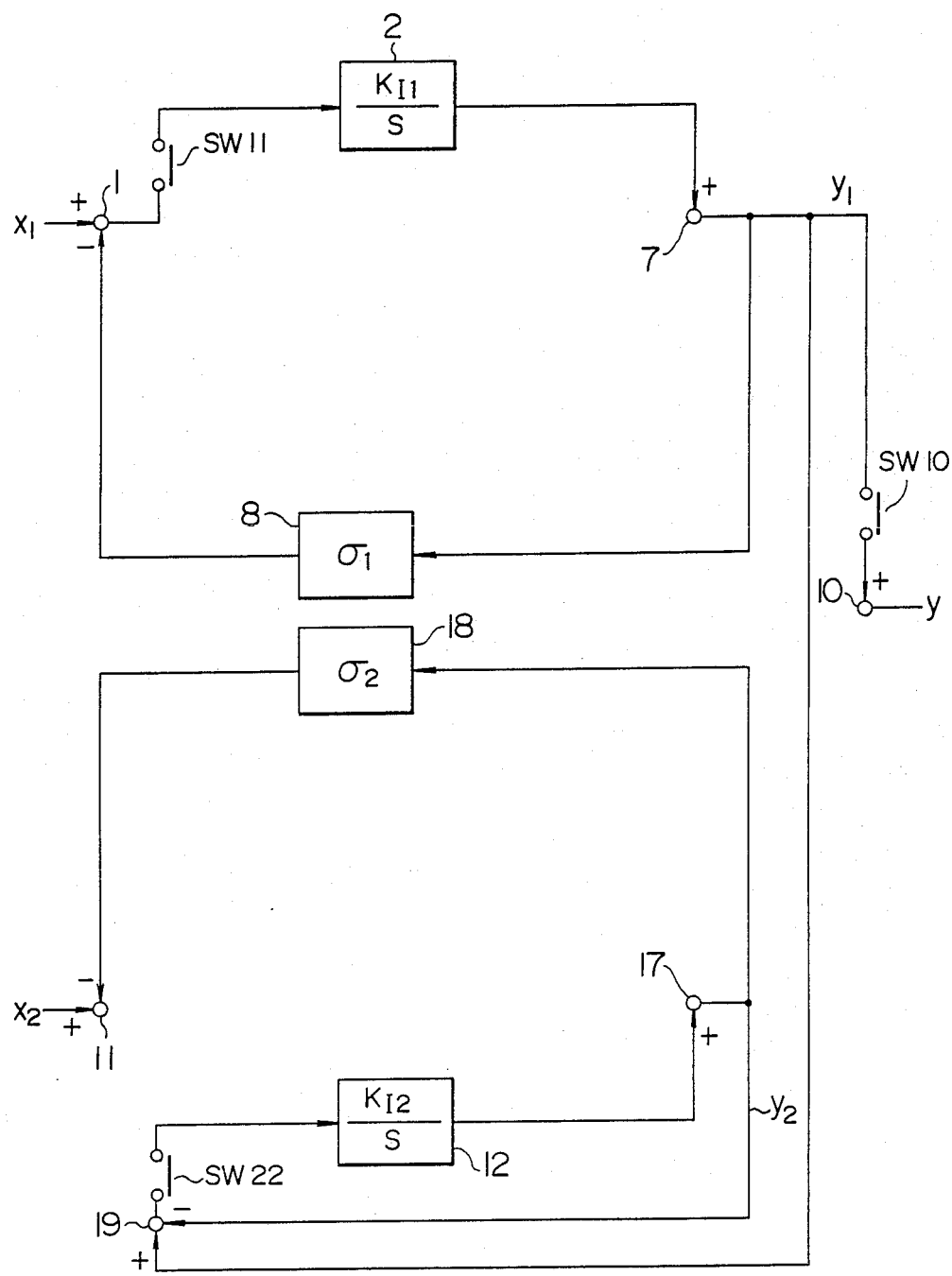
FIG. 11 is a diagram showing an automatic control circuit immediately after switching the operation from a second exclusive control circuit to a first exclusive control circuit according to the present invention.
Figure 12:
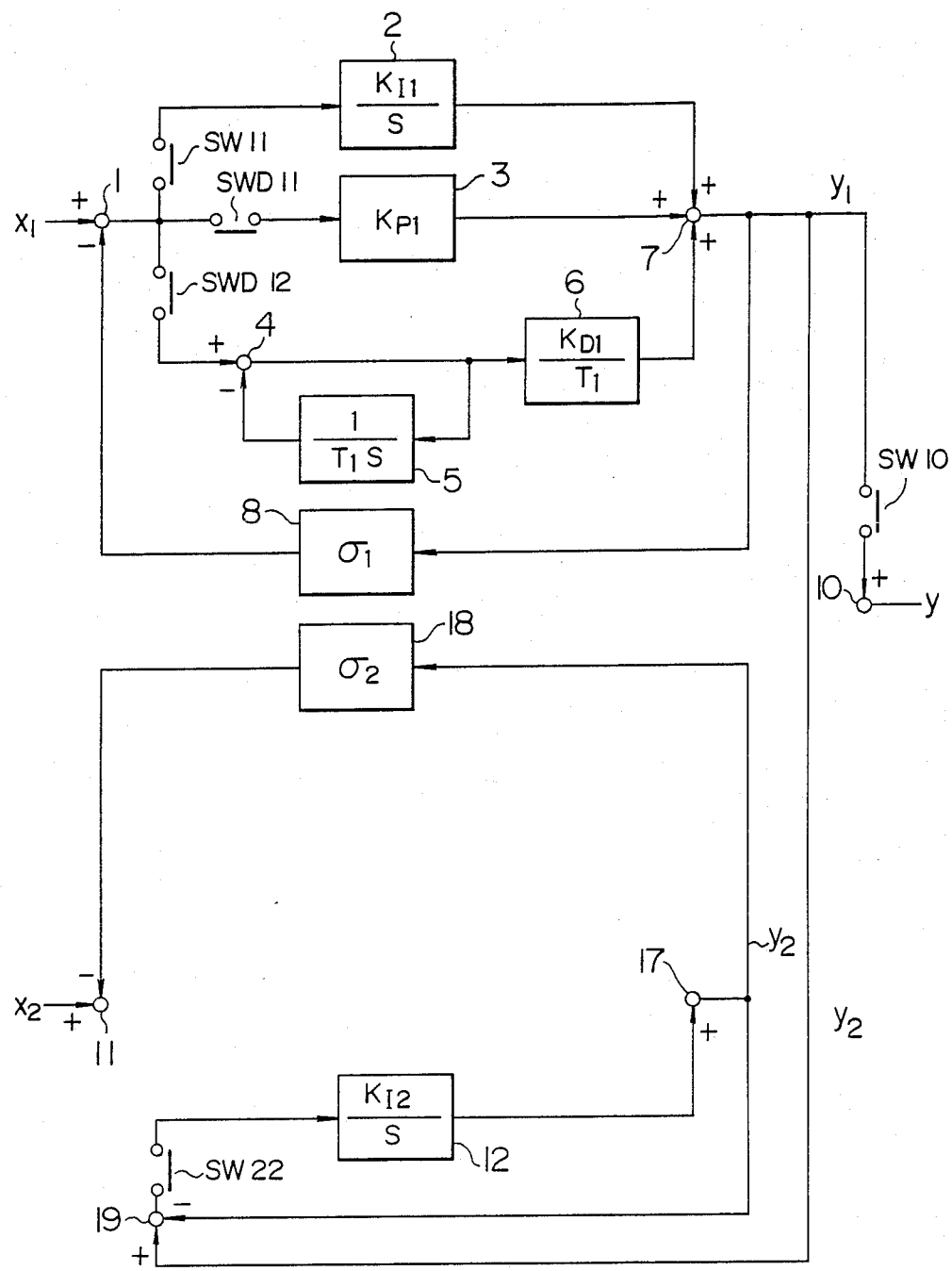
FIG. 12 is a diagram showing an automatic control circuit when the transient condition is stable in switching of operation from the second to the first exclusive control circuit according to the present invention.
Figure 13:
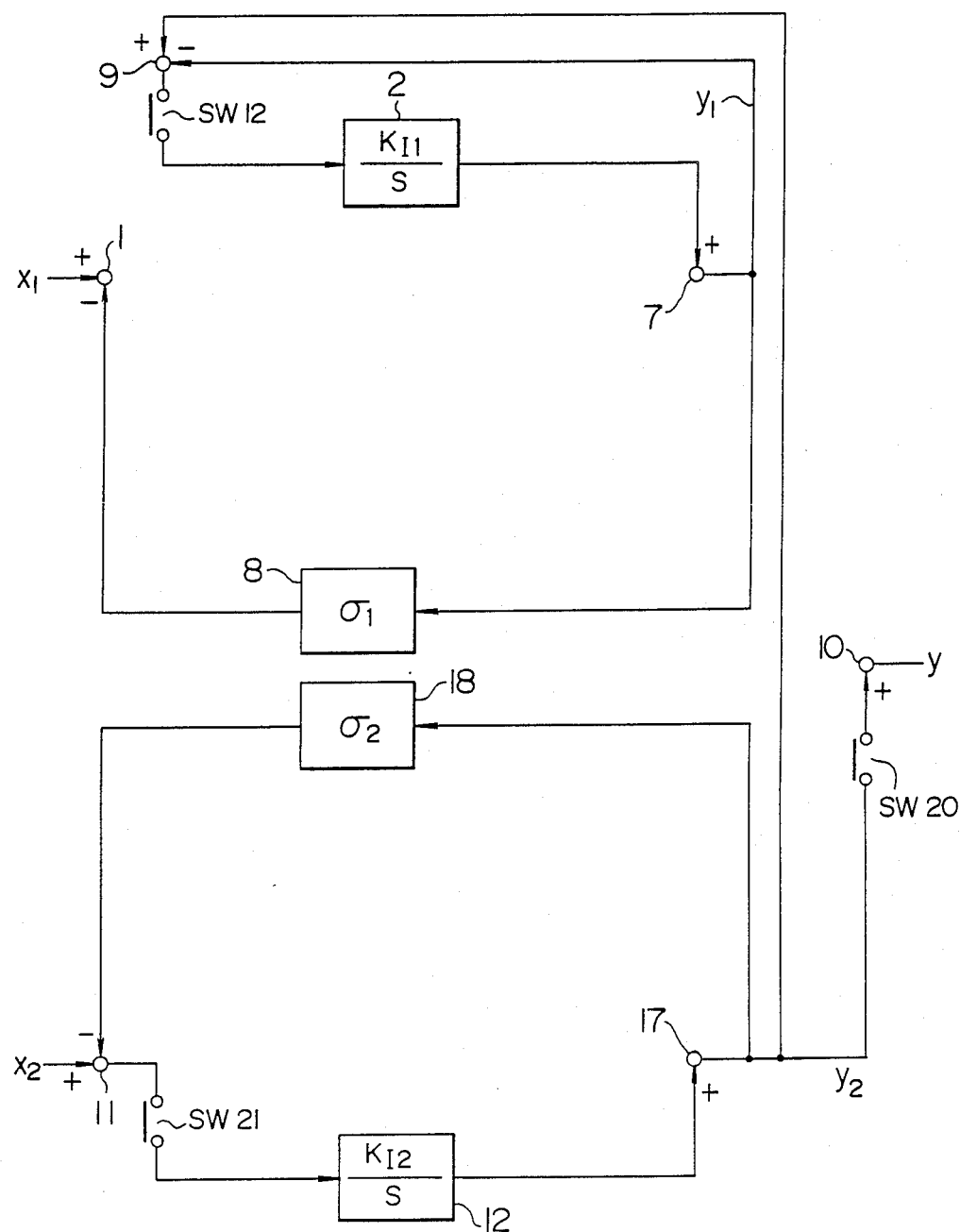
FIG. 13 is a diagram showing an automatic control circuit immediately after switching the operation from a first exclusive control circuit to a second exclusive control circuit according to the present invention.

A time chart of the operation of the contacts of a logic circuit shown in FIG. 5 is illustrated in FIG. 6. A character tD in FIG. 6 designates a predetermined time set by the timers T1 and T2 operated when the relay R1 is energized or de-energized. Further, an automatic control circuit effective when the second exclusive control circuit is in operation is shown in FIG. 10. In the case where the second exclusive control circuit is in operation, the relay R1 is normally de-energized, and the change-over switches SW 12, SW 20 and SW 21 are normally closed at the contact of the relay R1. The change-over switches SWD 23 and SWD 24, on the other hand, are closed with the lapse of a predetermined time set at the contact of the timer T2 energized upon de-energization of the relay R1. Specifically, in such a manner that the output $y_2$ of the second exclusive control circuit in operation is followed by the output of the integration element of the first exclusive control circuit under elimination, the error between the input $x_1$ of the first exclusive control circuit and the output value of the second exclusive control circuit is calculated at the junction point 9, so that the change-over switch SW 12 is turned on and is applied to the integration element 2. FIG. 11 shows an automatic control circuit with the operation switched from the second exclusive control circuit to the first exclusive control circuit (the relay R1 energized). The relay R1 is immediately energized, and the change-over switches SW 10, SW 11 and SW 22 making up a contact of the relay R1 are immediately closed. Therefore, on the basis of the input signal $x_1$ of the first exclusive control circuit, the output of the integration element 2 of the first exclusive control circuit is produced as an output $y_1$ and applied to y. The integration element 12 of the second exclusive control circuit, on the other hand, is supplied with an error obtained at a junction point 19 between the output $y_1$ of the first exclusive control circuit and the output of the integration element 12. Under this condition, the proportional elements 3, 13 and the differentiation elements 4 to 6 and 14 to 16 of the first and second exclusive control circuits are out of operation. FIG. 12 shows the automatic control circuit with the timer T1 turned on after the first exclusive control circuit is placed in operation. Upon energization of the relay R1, the timer T1 is energized after the lapse of a predetermined time set appropriately. As a result, the change-over switches SWD 11 and SWD 12 of the timer T1 are closed. The proportional element 3 and the differentiation elements 4 to 6 of the first exclusive control circuit are set in calculation mode, so that the output $y_1$ of the first exclusive control circuit is provided by the total sum of the integration element 2, the proportional element 3 and the differentiation elements 4 to 6.

In the process, the error between the input signal $x_1$ of the first exclusive control circuit and the feedback signal from the integration circuit 2 at the junction point 9 becomes substantially zero, and therefore no jump occurs in the element 3 or the differentiation elements 4 to 6.

Figure 14:
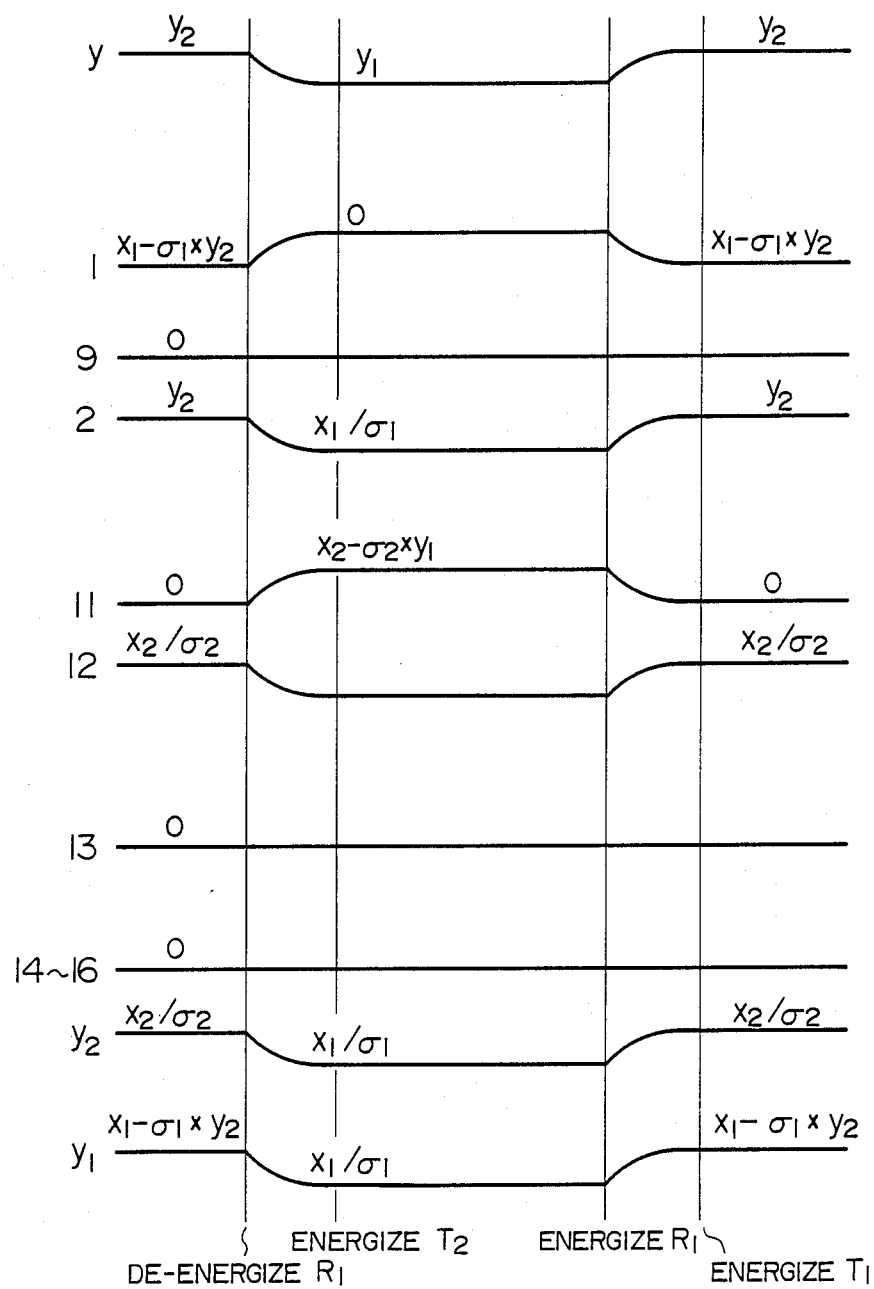
FIG. 14 shows changes in the amount of various signals at the time of change of operation of exclusive control circuits for an automatic control system according to the present invention.

FIG. 12 shows the automatic control circuit immediately after the operation is switched from the first exclusive control circuit to the second exclusive control circuit, and FIG. 14 shows a change of each signal amount due to the switching of the operation of the exclusive control circuits.

In FIGS. 10 to 14, the input ($x_1$, $y_1$) to the automatic control system is assumed to remain unchanged.

The proportional and differentiation elements have such a characteristic as to produce an abruptly-different output signal immediately after a sudden change in the input signal. If the change-over switches SWD 13 and SWD 14 are switched with the input signal zero, it is possible to prevent the effect of the proportional element and the differentiation element on the output of the exclusive control circuits. Specifically, even when the operation is switched from the second exclusive control circuit to the first exclusive control circuit, it is not necessary to switch the change-over switches SWD 13 and SWD 14 immediately but after the output value of the integration element 2 has reached the control target value ($x_1/\sigma_1$) to achieve the object of the invention. Also, when the operation is switched from the first exclusive control circuit to the second exclusive control circuit, the change-over switches SWD 23 and SW 24 perform the same operation as the switches SWD 13 and SWD 14.

Figure 7:
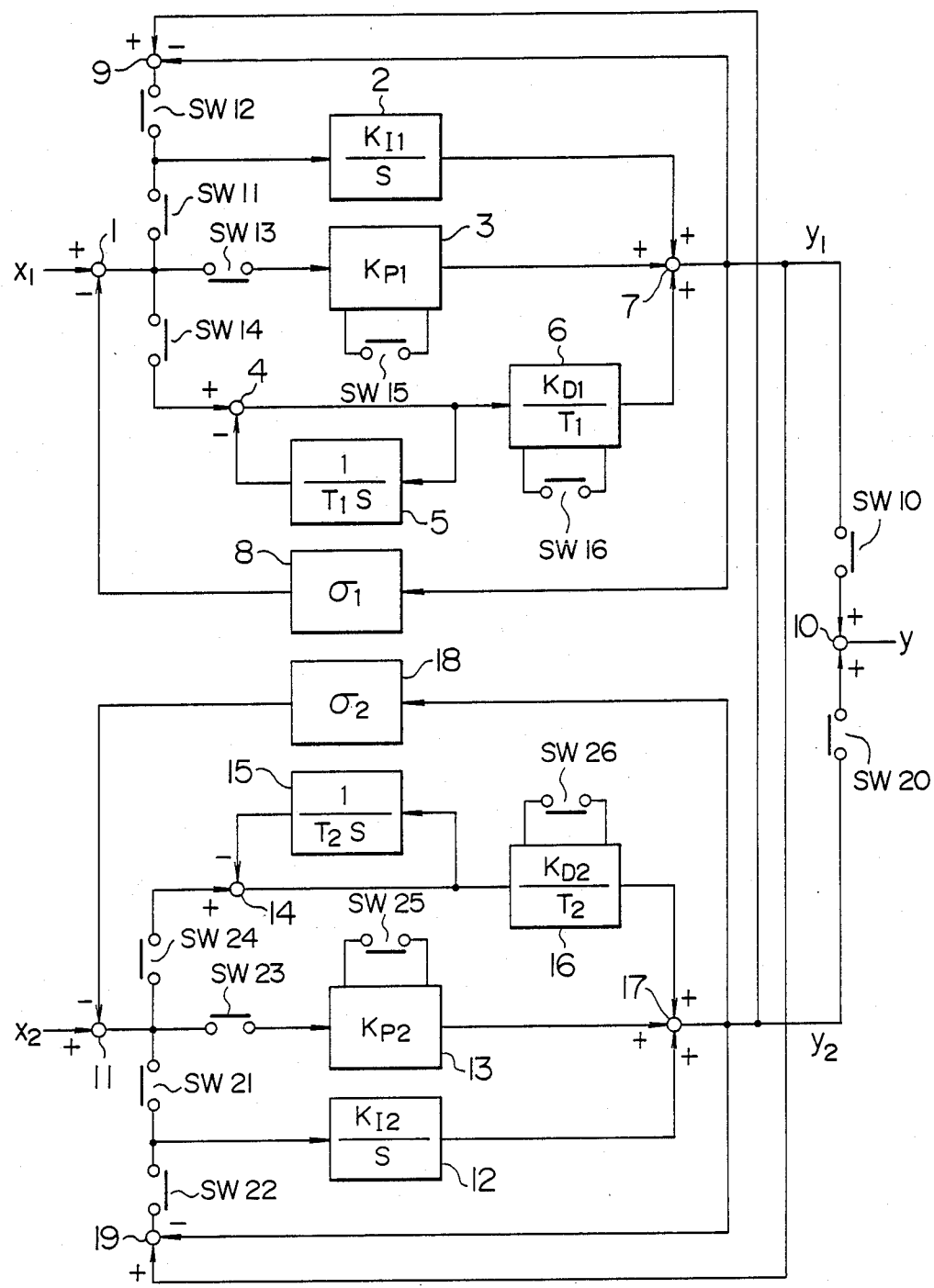
FIG. 7 is a diagram showing a control circuit according to a embodiment of the invention.

The object of the present invention can also be achieved obviously without providing the change-over switches SWD 13, SWD 14, SWD 23 or SWD 24 performed with a time function by maintaining at zero the gains of the proportional element and the differentiation elements in the manner mentioned below. Specifically, at the same time that the operation is switched from one exclusive control circuit to another, the gain of the proportional element 8 or 13 or the differentiation elements 4 to 6 or 14 to 16 is reduced to zero, and when the output value of the integration element 2 or 12 in operation reaches a control target value ($x_1/\sigma_1$) or ($x_2/\sigma_2$) based on the input signal $x_1$ or $x_2$ respectively or enters a range within a certain error, a predetermined gain is secured. This is achieved by the control circuit shown in FIG. 7.

Figure 8:
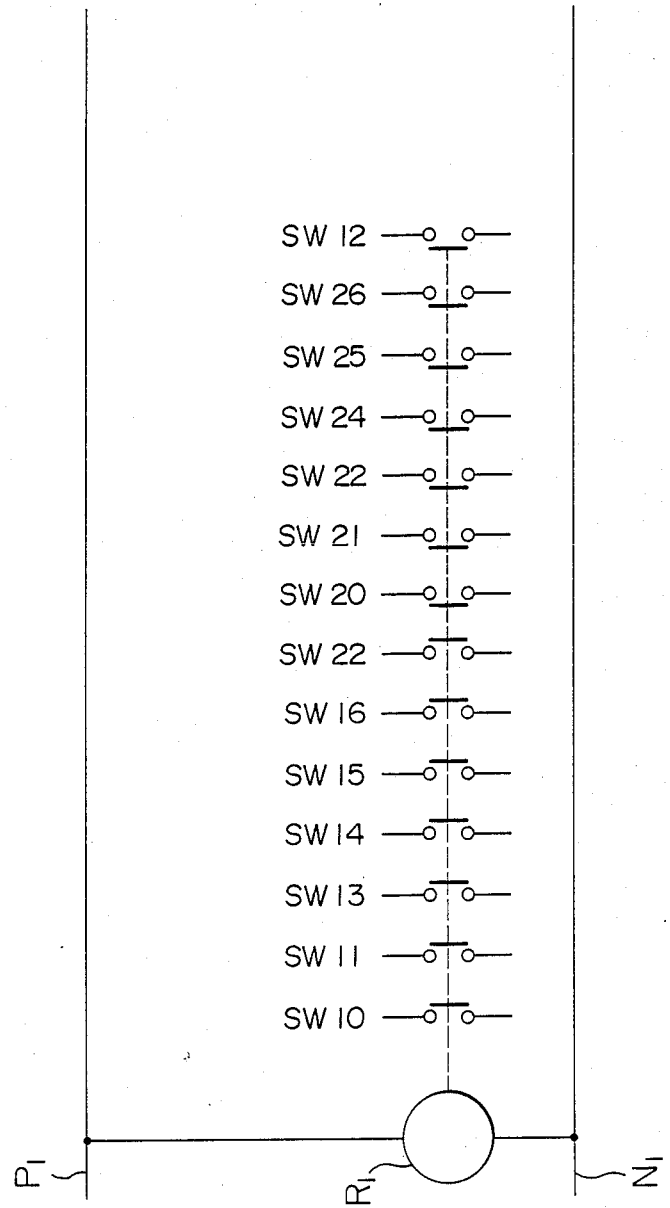
FIG. 8 is a diagram showing a logic circuit for the change-over switch used in the control circuit shown in FIG. 7.
Figure 9:
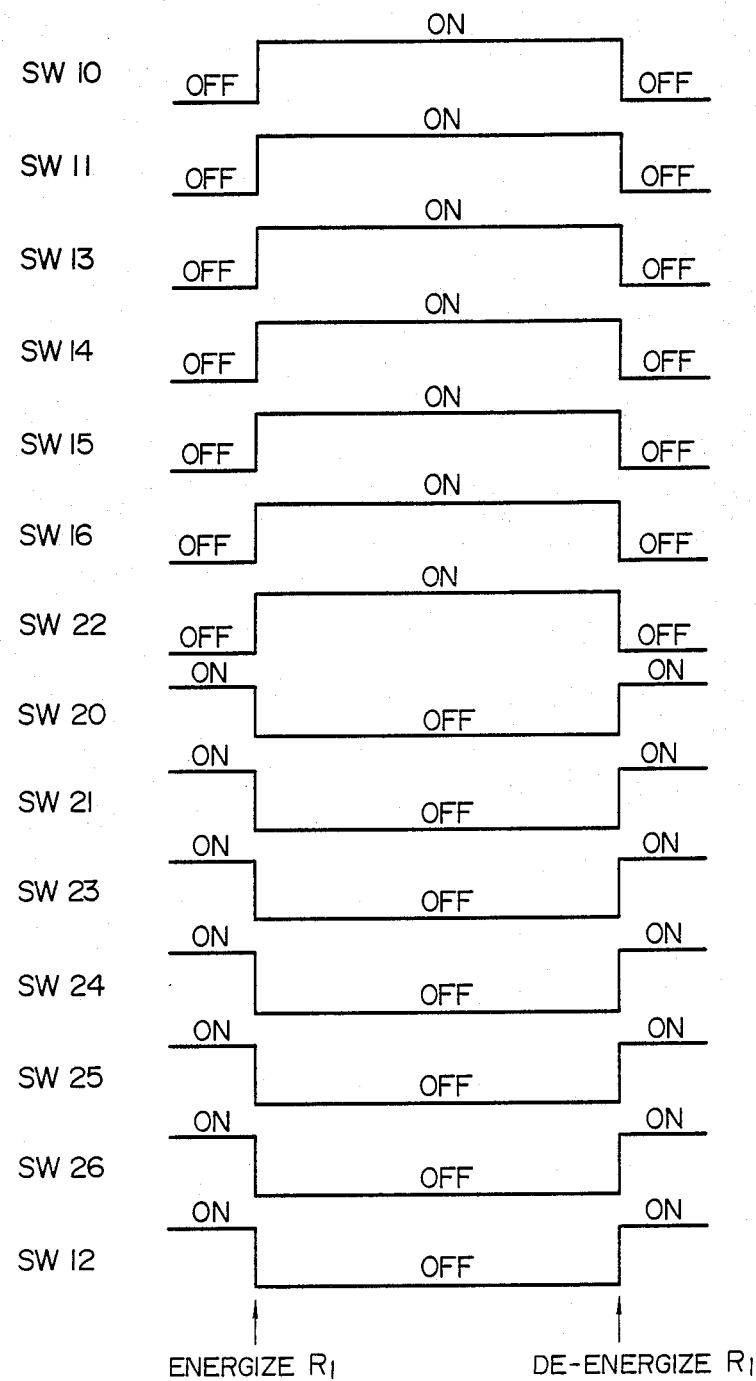
FIG. 9 is a time chart showing the operation of the change-over switch for the control circuit shown in FIG. 7.

A second embodiment of the present invention features a function in which the gains of the proportional element and the differentiation elements are reduced to zero by input of an on-signal, and after the gains are kept at zero for a predetermined time, the normal control gain is restored. FIG. 8 shows a logic circuit of various change-over switches used with the control circuit shown in FIG. 7. The relay R1 is normally energized when the first exclusive control circuit is in operation. The change-over switches SW 10, SW 11, SW 13, SW 14, SW 15, SW 16 and SW 22 provide a contact b adapted to close upon energization of the relay R1. The change-over switches SW 20, SW 21, SW 22, SW 24, SW 25, SW 26 and SW 12, on the other hand, constitute a contact b adapted to open upon energization of the relay R1. Also, FIG. 19 shows a time chart of operation of the change-over switches.

More specifically, when the operation is switched from the second exclusive control circuit to the first exclusive control circuit, the relay R1 is energized, so that the change-over switches SW 15 and SW 16 for input of a turn-on signal to the proportional element 3 and the differentiation element (differentiation gain element) 6 of the first exclusive control circuit are closed at the same time as the energization of the relay R1. The proportional element 3 and the differentiation element 6 thus reduce the gains to zero immediately and hold them at zero for a predetermined time, after which a normal gain is restored. The predetermined time is defined as a time required before the integration element 2 reaches a control target value of the first exclusive control circuit and the error input against the proportional element 3, the integration element 2 and the differentiation elements 4, 5, 6 is reduced almost to zero.

In the case where the operation is switched from the first exclusive control circuit to the second exclusive control circuit, on the other hand, the change-over switches SW 25 and SW 26 for a turn-on signal input to the proportional element 13 and the differentiation element (differentiation gain element) 16 of the second exclusive control circuit are closed with the de-energization of the relay R1. The operation mentioned above is similar to the one performed when the operation is switched from the second exclusive control circuit to the first exclusive control circuit.

As result, the operation can be switched smoothly in the same manner as shown in FIG. 4.

In spite of the fact that the above-mentioned embodiments use the same exclusive circuit for the first and second control circuits, a manual control system may be used with equal effect without departing the spirit of the invention.

FIG. 17 is a digital flowchart useful for explaining embodiments of the present invention. First, a step 31 decides on the presence or absence of a switching command of and exclusive control circuit. In the presence of a switching command for an exclusive control circuit, a step 32 places the integration element of the exclusive control circuit involved in operation, that is, begins a calculation. The operation of the integration element is implemented by the error between the input signal to the exclusive control circuit to be placed in operation and the feedback signal based on the output value of the integration element. In the absence of the switching command for the exclusive control circuits, on the other hand, a step 38 continues the calculation by the proportional element, integration element and the differentiation element of the exclusive control circuit in operation. When the integration element of an exclusive control circuit to be placed in operation is switched to operation, a step 33 places the integration element of the exclusive control circuit so far in operation in a follow-up control against the output of the exclusive control circuit newly placed in operation. A step 34 clears the proportional element and differentiation element of the exclusive control circuits in and out of operation to zero while at the same time stopping the calculation in order to prevent jump phenomenon at the time of switching of the exclusive control circuits. As a result, an output is produced only from the integration element of the exclusive control circuit newly placed in operation. Now, a step 35 repeatedly decides whether or not the error is substantially zero between the input signal to the exclusive control circuit newly placed in operation and the feedback signal based on the output of the integration element of the exclusive control circuit newly placed in operation, that is, whether x is almost $y/\sigma$. If the error is found is almost zero, a step 36 sets a formal gain in the proportional element and the differentiation element of the exclusive control circuit newly placed in operation, while at the same time starting calculation. A step 37 thus produces a sum of the proportional element, the integration element and the differentiation element as an output of the exclusive control circuit newly placed in operation.

It will thus be understood from the foregoing description that according to the present invention, smooth switching is possible without causing any jumping phenomenon of the proportional element of the differentiation element at the time of switching the exclusive control circuits in operation.

This invention finds an application for example in the governor for a hydraulic power plant. The governor accomplishes such various functions as speed control of a turbine generator, load regulation of a turbine generator, load limitation of a turbine generator and water level regulation of a dam of a hydraulic power plant. These functions of control are randomly selected and this invention is useful for switching at the time of such selection. The present invention is indispensable especially when a computer system is used as a control unit for the governor.

We claim:

1. An automatic control system for controlling an object comprising:
   a first control circuit;
   a second control circuit including an integration circuit receiving an error signal between a target signal and a feedback signal, at least one of a proportional circuit and a differentiation circuit receiving the error signal, and an adder circuit for adding an output of the integration circuit and an output of at least one of the proportional circuit and the differentiation circuit, said feedback signal being provided by an output of the adder circuit; and
   a selection circuit for selecting one of the outputs of the first and second control circuits;
   said automatic control system further comprising:
   first means for applying the error signal to the input of the integration circuit of the second control circuit when control of the object is switched from the output of the first control circuit to the second control circuit; and
   second means for applying the error signal to at least one of the proportional circuit and the differentiation circuit of the second control circuit after the lapse of a predetermined time following the operation of the first means.

2. An automatic control system for controlling an object comprising:
   a first control circuit;
   a second control circuit including an integration circuit receiving an error signal between a target signal and a feedback signal, at least one of a proportional circuit and a differentiation circuits receiving the error signal, and an adder circuit for adding an output of the integration circuit to an output of at least one of the proportional circuit and the differentiation circuit, the feedback signal being provided by the output of the adder circuit; and a selection circuit for selecting one of the outputs of the first and second control circuit;

said automatic control system further comprising:

first means for applying the error signal to the input of the integration circuit of the second control circuit when control of the object is switched from the output of the first control circuit to the output of the second control circuit; and second means for providing a given gain and applying the error signal to at least one of the proportional circuit and the differentiation circuit of the second control circuit after the lapse of a predetermined time following the operation of the first means.

3. An automatic control system for controlling an object comprising:

a first control circuit and a second control circuit, each including an integration circuit receiving an error signal between a target signal and a feedback signal, at least one of a proportional circuit and a differentiation circuit receiving the error signal, and an adder circuit for adding an output of the integration circuit to an output of at least one of the proportional circuit and the differentiation circuit, the feedback signal being provided by the output of the adder circuit; and a selection circuit for selecting one of outputs of the first and second control circuits;

said automatic control system further comprising:

first means for applying the error signal to the input of the integration circuit of the second control circuit, and second means for applying the error signal to at least one of the proportional circuit and the differentiation circuits of the second control circuit after the lapse of a predetermined time following the operation of the first means when control of the object is switched from the output of the first control circuit to the output of the second control circuit.

4. An automatic control system for controlling an object comprising:

a first control circuit and a second control circuit, each including an integration circuit receiving an error signal between a target signal and a feedback signal, at least one of a proportional circuit and a differentiation circuit receiving the error signal, and an adder circuit for adding an output of the integration circuit to an output of at least one of the proportional circuit and the differentiation circuit, the feedback signal being provided by an output of the adder circuit; and a selection circuit for selecting one of outputs of the first and second control circuits;

said automatic control system further comprising:

first means for applying the error signal to the input of the integration circuit of the second control circuit, and second means for providing a given gain and applying the error signal to at least one of the proportional circuit and the differentiation circuit of the second control circuit after the lapse of a predetermined time following the operation of the first means, when control of the object is switched from the output of the first control circuit to the output of the second control circuit.

5. An automatic control system for controlling an object comprising:

a first control circuit and a second control circuit, each including an integration circuit receiving a first error signal between a target signal and a feedback signal, at least one of a proportional circuit and a differentiation circuit receiving the first error signal, and an adder circuit for adding an output of the integration circuit to an output of at least one of the proportional circuit and the differentiation circuit, the feedback signal being provided by an output of the adder circuit; and a selection circuit for selecting one of the outputs of the first and second control circuits;

said automatic control system further comprising:

first means for preventing the first error signal from being applied to the integration circuit and at least one of the proportional circuit and the differentiation circuit of the second control circuit, and second means for applying a second error signal between an output of the adder circuit of the second control circuit and an output of the first control circuit to the input of the integration circuit of the second control circuit, when control of the object is being controlled by the output of the first control circuit; and third means for applying the first error signal to the input of the integration circuit of the second control circuit, and fourth means for applying the first error signal to at least one of the proportional circuit and the differentiation circuit of the second control circuit after the lapse of a predetermined time following the operation of the third means, when control of the object is switched from the output of the first control circuit to the output of the second control circuit.

6. An automatic control system for controlling an object comprising:

a first control circuit and a second control circuit, each including an integration circuit receiving a first error signal between a target signal and a feedback signal, at least one of a proportional circuit and a differentiation circuit receiving the first error signal, and an adder circuit for adding an output of the integration circuit to an output of at least one of the proportional circuit and the differentiation circuit, the feedback signal being provided by an output of the adder circuit; and a selection circuit for selecting one of outputs of the first and second control circuits;

said automatic control system further comprising:

first means for preventing the first error signal from being applied to the integration circuit of the second control circuit, second means for reducing to zero the gain of at least one of the proportional circuit and the differentiation circuit of the second control circuit, and third means for applying a second error signal between the output of the adder circuit of the second control circuit and the output of the first control circuit to the input of the integration circuit of the second control circuit, when control of the object is being controlled by the output of the first control circuit; and fourth means for applying the first error signal to the input of the integration circuit of the second control circuit, and fifth means for providing a given gain and applying the first error signal to at least one of the proportional circuit and the differentiation circuit of the second control circuit after the lapse of a predetermined time following the operation of the fourth means, when control of the object is switched from the output of the first control circuit to the output of the second control circuit.

7. An automatic control system for controlling an object, comprising:
a first control circuit and second control circuit, each including an integration circuit receiving a first error signal between a target signal and a feedback signal, a proportional circuit and a differentiation circuit receiving the first error signal, and an adder circuit for adding an output of the integration circuit to outputs of the proportional circuit and the differentiation circuit, the feedback signal being provided by an output of the adder circuit;
a selection circuit for selecting one of the outputs of the first and second control circuits, the object being controlled by an output of the selection circuit; and
said automatic control system further comprising:
first means for preventing the first error signal from being applied to the integration circuit, the proportional circuit and the differentiation circuit of the second control circuit, and second means for applying a second error signal between an output of the adder circuit of the second control circuit and an output of the first control circuit to the input of the integration circuit of the second control circuit, when control of the object is being controlled by the output of the first control circuit,
third means for applying the first error signal between the target signal and the feedback signal to the input of the integration circuit of the second control circuit, and fourth means for applying the first error signal between the target signal and a feedback signal to a proportional circuit and a differentiation circuit of the second control circuit after the lapse of a predetermined time following the operation of the third means, when control of the object is switched from the output of the first control circuit to the output of the second control circuit; and
fifth means for preventing the first error signal from being applied to the integration circuit, the proportional circuit and differentiation circuits of the first control circuit, and sixth means for applying the second error signal between an output of the second control circuit and an output of the adder circuit of the first control circuit to the input of the integration circuit of the first control circuit, when the object of operation is being controlled by the output of the second control circuit.

8. An automatic control system for controlling an object, comprising:
a first control circuit and a second control circuit, each including an integration circuit receiving a target signal and a feedback signal, a proportional circuit and a differentiation circuit receiving the first error signal, and an adder circuit for adding an output of the integration circuit and outputs of the proportional circuit and the differentiation circuit, the feedback signal being provided by an output of the adder circuit;
a selection circuit for selecting one of outputs of the first and second control circuits, the object being controlled by the output of the selection circuit; and
said automatic control system further comprising:
first means for preventing the first error signal from being applied to the integration circuit of the second control circuit, second means for reducing to zero the gains of the proportional circuit and the differentiation circuit of the second control circuit, and third means for applying a second error signal between the output of the adder circuit of the second control circuit and the output of the first control circuit to the input of the integration circuit of the second control circuit, when control of the object is being controlled by the output of the first control circuit;
fourth means for applying the first error signal to the input of the integration circuit of the second control circuit, and fifth means for providing a given gain and applying the first error signal to the proportional circuit and the differentiation circuit of the second control circuit after the lapse of a predetermined time following the operation of the fourth means, when control of the object is switched from the output of the first control circuit to the output of the second control circuit; and
sixth means for preventing the first error signal from being applied to the integration circuit of the first control circuit, seventh means for reducing to zero the gains of the proportional circuit and the differentiation circuit of the first control circuit, and eighth means applying a second error signal between the output of the adder circuit of the first control circuit and the output of the second control circuit to the input of the integration circuit of the first control circuit, when control of the object is being controlled by the output of the second control circuit.

* * * * *